United States Patent [19]

Laine

[11] Patent Number: 4,789,534
[45] Date of Patent: Dec. 6, 1988

[54] TRANSITION METAL CARBIDES AND PROCESS FOR MAKING SAME

[75] Inventor: Richard M. Laine, Palo Alto, Calif.

[73] Assignee: SRI International, Menlo Park, Calif.

[21] Appl. No.: 119,303

[22] Filed: Nov. 6, 1987

Related U.S. Application Data

[63] Continuation of Ser. No. 900,592, Aug. 26, 1986, abandoned, which is a continuation-in-part of PCT US86/00058 filed Jan. 1, 1986, which is a continuation-in-part of Ser. No. 727,524, Apr. 26, 1985, abandoned.

[51] Int. Cl.$^4$ .................. C01F 15/00; C01F 17/00; C01G 43/00; C01G 39/00; C01G 41/00
[52] U.S. Cl. .................. 423/241; 423/256; 423/439; 423/440
[58] Field of Search .................. 423/249, 256, 439, 440

[56] References Cited

U.S. PATENT DOCUMENTS

| | | | |
|---|---|---|---|
| 2,922,819 | 1/1960 | Chatt et al. | 260/606.5 |
| 3,061,465 | 10/1962 | Norman et al. | 501/93 X |
| 3,064,021 | 1/1962 | Wilkinson | 260/429 |
| 3,070,615 | 12/1962 | Seyferth | 260/429.7 |
| 3,266,875 | 8/1966 | Romeo | 423/440 X |
| 3,272,600 | 9/1966 | Sowden et al. | 423/256 X |
| 3,377,141 | 4/1968 | Hardy et al. | |
| 3,482,940 | 12/1969 | Krupka et al. | 423/439 X |
| 3,494,738 | 2/1970 | Gray et al. | |
| 3,529,988 | 9/1970 | Woerner | 501/93 X |
| 3,554,782 | 1/1971 | Nieberlein | |
| 3,574,672 | 4/1971 | Tarver | |
| 3,764,550 | 10/1973 | Block et al. | |
| 3,836,631 | 9/1974 | Tagawa et al. | 423/256 |
| 3,865,745 | 2/1975 | Block et al. | 423/256 X |
| 3,880,769 | 4/1975 | Googin et al. | |
| 3,976,749 | 8/1976 | Wedemeyer | |
| 3,979,500 | 9/1976 | Sheppard et al. | 423/439 X |
| 4,080,431 | 3/1978 | Mossi | 423/440 X |
| 4,333,915 | 6/1982 | Iwai et al. | |
| 4,333,916 | 6/1982 | Iwai et al. | |
| 4,426,366 | 1/1984 | McCandlish et al. | |

FOREIGN PATENT DOCUMENTS

| | | |
|---|---|---|
| 1329628 | 4/1962 | France |
| 1359694 | 1/1963 | France |

OTHER PUBLICATIONS

Shunk, F. A., *Constitution of Binary Alloys, Second Supplement*, McGraw-Hill, N.Y. (1969), pp. 140-172.
Aylett et al., *J. Chem. Soc., Dalton Transactions*, No. 20: 2058-2061 (1977).
Aylett et al., *Vacuum*, 35: 435-439 (1985).
Gorgoraki et al., *J. Appl. Chem. of the USSR*, 46(7): 1639-1641 (1974).
Hasegawa et al., *J. Mat. Sci.*, 18:3633-48 (1983).
Hurd et al., *Ind. and Engin. Chem.*, 44(10):2432-35 (1952).
Laine et al., *J. Organometallic Chem.*, 124: 29-35 (1977).
Mulay et al., *J. Organometallic Chem.*, 178:217-226 (1979).
Schwartzkopf et al., *Refractory Hard Metals: Borides, Carbides, Nitrides, and Silicides*, (New York: MacMillen and Co., 1953).
Sugiyama et al., *J. Electrochem. Soc.*, 122(11):1545-1549 (1975).
Chem. Abs. 7742j, vol. 73 (1970), "Effect of Electron . . .", p. 294.
Chem. Abs. 51763s, vol. 100 (1984), "Thermodynamic Study . . .", p. 37.
Chem. Abs. 77559, vol. 86 (1977), "Precipitation of Titanium Carbide . . .", p. 325.
Chem. Abs. 78827x, vol. 74 (1971), "Metallic Films . . .", p. 161.
Chem. Abs. 92657w, vol. 86 (1977), "Iron Carbide", p. 184.
Chem. Abs. 105373g, vol. 79 (1973), "Pyrolysis of . . .", p. 441.
Chem. Abs. 111618g, vol. 85 (1976), "Deposition of Metal . . .", p. 200.

(List continued on next page.)

*Primary Examiner*—Matthew A. Thexton
*Attorney, Agent, or Firm*—Ciotti & Murashige, Irell & Manella

[57] ABSTRACT

Transition metal carbides in which the carbon is in excess and is covalently bound to the metal are produced by pyrolyzing transition metal amides that have two or more metal atomos, such as hexakis(dimethylamido) ditungsten or dimolybdenum.

9 Claims, 2 Drawing Sheets

OTHER PUBLICATIONS

Girolami et al., *J. Am. Chem. Soc.* (1987), 109:1579–1580.
Chem. Abs. 164968c, vol. 85 (1976), "Use of Organotitanium . . .", p. 329.
Chem. Abs. 195948q, vol. 99 (1983), "Organometallic Copolymers", p. 593.
Chem. Abs. 195951k, vol. 99 (1983), "Poly(titanocarbosilanes)", p. 593.
Derwent Abstract 02749x/02 (2nd week, 1976), "Iron Carbide Mfr.- . . .".
Derwent Abstract 09810x/06 (6th week, 1976), "Iron Carbide Prepr.- . . .".
"Technology Forecast '86: Surface Treating and Coating", *Met. Prog.* (Jan. 1986), pp. 45–48.

TRANSITION METAL CARBIDES AND PROCESS FOR MAKING SAME

CROSS REFERENCE TO RELATED APPLICATION

This application is a continuation, of application Ser. No. 900,592, filed Aug. 26, 1986, which is a continuation-in-part of PCT US86/00058 filed Jan. 1, 1986, which is a continuation-in-part of Ser. No. 727,524, filed Apr. 26, 1985 now abandoned.

DESCRIPTION

1. Technical Field

This invention is in the field of transition metal carbides. More specifically it relates to a process for making transition metal carbides by pyrolyzing certain transition metal amides and to novel transition metal carbides made by that process.

2. Background

Metal carbides, such as tungsten carbide, are used in making a variety of hard and/or high temperature materials. Metal carbides are made conventionally by blending carbon with metal powder and carburizing the metal at elevated temperatures. This procedure produces a metal carbide powder whose properties (high hardness, high melting) are not amenable to permitting the material to be readily manipulated into other forms such as coatings, fibers, or shaped objects.

Parent application Ser. No. 727,524 addresses the problem of how to readily produce metal carbides in the form of coatings, fibers or shaped objects. It generally describes a procedure for producing the metal carbide by pyrolyzing tractable organometallic precursors in which organic ligands are bonded to the metal. The tractability of the precursor enables it to be placed in the desired form before it is pyrolyzed to the metal carbide. The present invention involves the use of a particular class of organometallics, polynuclear metal amides that contain two or more metal atoms, that were found unexpectedly to be metal carbide precursors. In this regard prior workers reported in *J. Electrochem. Soc.*, (1975) 122: 1545–1549 that mononuclear metal dialkylamides which contain one metal atom thermally decomposed in the gas phase to produce metal nitrides. It was expected, therefore, that the polynuclear metal amide precursor would yield metal nitrides rather than metal carbides. It was further found that metal carbides in which the carbon is in excess and is bound covalently to the metal may be produced by pyrolyzing certain metal amides containing two or more metal atoms. Such metal carbides are believed to be novel.

The art directly relating to metal carbides in which there is excess carbon is exemplified by U.S. Pat. No. 3,865,745 and *Refractory Hard Metals: Borides, Carbides, Nitrides and Silicides*, Schwarzkopf, P., et al, MacMillen and Co., New York, (1953). The patent describes the preparation of metal carbide microspheres by heating in the presence of steam microspheres of ion exchange resins that have been pretreated with metal ion solution. The patent indicates that the carbon in the microspheres can be in molar excess depending upon the heating conditions. It is believed that the carbon in this product is not present in the form of a covalently bound species, but is instead present in the form of excess carbon (graphite) in solid solution. Also, in view of the presence of steam in the process, the product is contaminated by oxycarbide to greater or lesser extent depending on the heating conditions. *Refractory Hard Metals: Borides, Carbides, Nitrides and Silicides* confirms this belief in that it shows a phase diagram for mixtures of W and C which indicates that above W:C atom ratios of 1:1, one obtains WC plus C with the excess carbon being free carbon.

DISCLOSURE OF THE INVENTION

The invention provides a novel process for making metal carbides by pyrolyzing certain polynuclear metal amides and novel metal carbides that may be made by that process.

The invention process for making a transition metal carbide comprises pyrolyzing a tractable transition metal amide of the formula:

$$M_x(NR^1R^2)_y \qquad (1)$$

where M is a transition metal, x is an integer and is equal to or greater than 2, $R^1$ and $R^2$ are the same or different and are hydrogen, lower alkyl (1 to 4 carbon atoms), trimethylsilyl or ethylene, with the proviso that both $R^1$ and $R^2$ are not hydrogen, and y is equal to the valence of the $M_x$ unit, under nonoxidizing conditions at a temperature at which a carbon-containing group of the amido group of formula (1) undergoes chemical reaction with a metal atom of the metal amide to form at least one covalent carbon-to-metal bond.

The novel nonstoichiometric metal carbides of the invention are carbides of a transition metal wherein the atom ratio of carbon to metal is greater than 1:1 and the carbon is covalently bound to the metal. The ration may be stoichiometric or nonstoichiometric.

The advantages of the invention include the following:

(1) Lower temperatures in the preparation of the metal compound or alloy $M_aX_b$ wherein M represents the metal or metals, X represents the combining element or elements and the subscripts a and b represent the atomic proportions of M and X.;
(2) A simplified procedure;
(3) Greater control over the combining proportions, a and b;
(4) More facile methods of application of $M_aX_b$ to end products; and
(5) Potential routes to materials or material morphologies that have heretofore been impossible or difficult to prepare.

MODES FOR CARRYING OUT THE INVENTION

Figure 1:
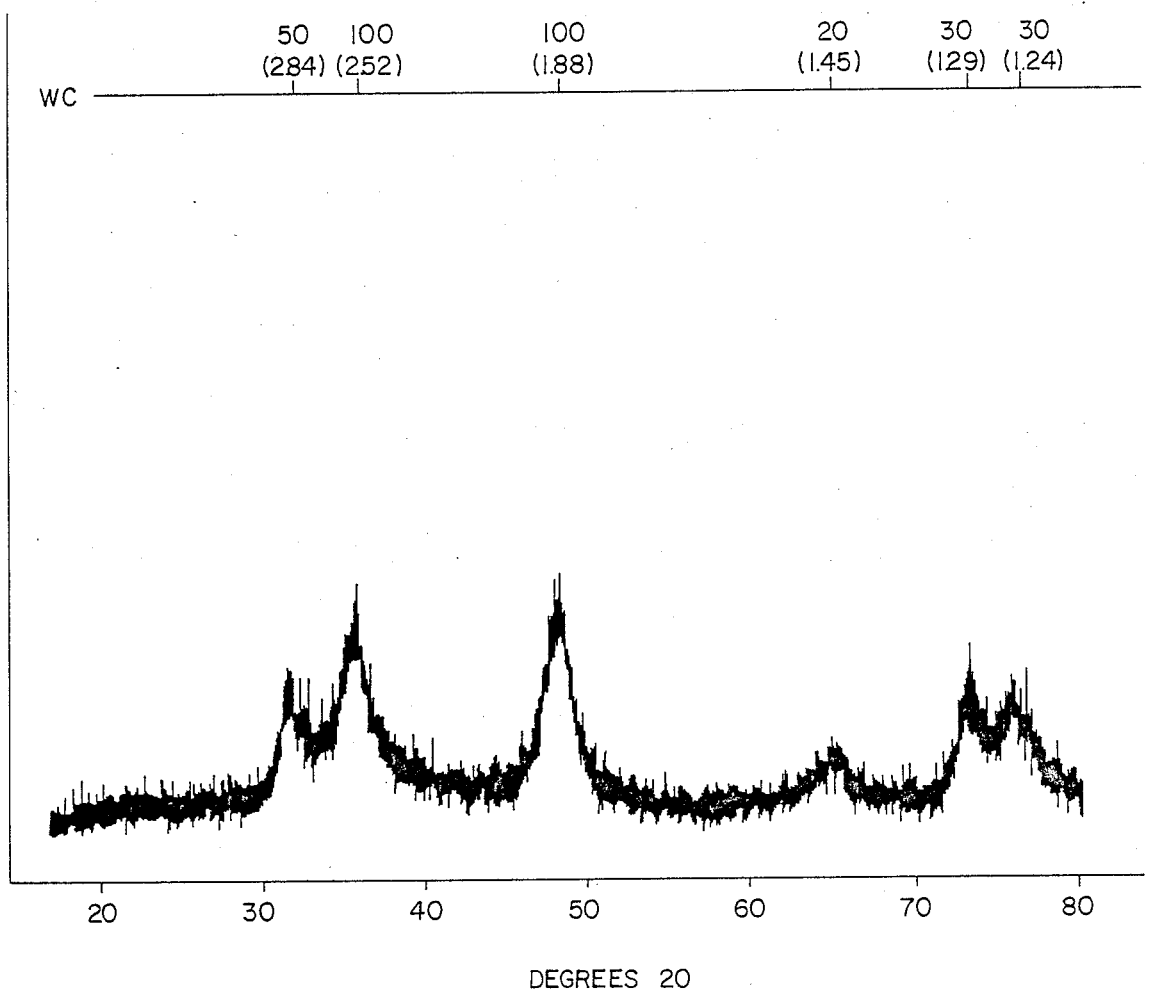
FIG. 1 is an X-ray powder diffraction pattern of the metal carbide product of Example 1, infra.

As used herein, the term "transition metal" means an element which has the filling of its outermost shell to 8 electrons interrupted to bring its penultimate shell from 8 to 18 or 32 electrons. The term encompasses elements of atomic number 21 through 29 (scandium through copper), 39 through 47 (yttrium through silver), 57 through 79 (lanthanum through gold) and all elements from atomic number 89 (actinium) on. Preferred transition metals for the purpose of the invention are those of Group VI B of the Periodic Table. Particularly preferred transition metals are tungsten (W) and molybdenum (Mo).

As used herein the term "tractable" means that the designated metal amide is sufficiently soluble, meltable or malleable that it can be formed into desired shapes either by itself, in solution, or melt or mixture with the metal carbide powder, as the case may be, at relatively low temperatures (i.e., below about 200° C.).

The metal amide precursors that are used to make the metal carbides are of the general formula:

$$M_x(NR^1R^2)_y \quad (1)$$

where M is a transition metal, x is an integer and is equal to or greater than 2, preferably equal to 2, $R^1$ and $R^2$ are the same or different and are hydrogen, lower alkyl (1 to 4 carbon atoms, preferably straight-chain), trimethylsilyl, or ethylene, with the proviso that both $R^1$ and $R^2$ are not hydrogen, and y is an integer equal to the valence of the $M_x$ unit. As indicated above, $M_x$ is preferably a Group VI A metal dimer, oligomer or polymer and most preferably ditungsten or dimolybdenum. Alkyl radicals represented by $R^1$ and $R^2$ include methyl, ethyl, propyl, isopropyl and butyl. Preferred alkyl radicals are methyl and ethyl. When $R^1/R^2$ represent ethylene they form cyclic structures with the metal and nitrogen of the amide.

Examples of preferred metal amides represented by formula (1) are hexakis(methylamido) dichromium, hexakis(dimethylamido) dichromium, hexakis(ethylamido) dichromium, hexakis(diethylamido) dichromium, hexakis(methylethylamido) dichromium, hexakis(propylamido) dichromium, hexakis(isopropylamido) dichromium, hexakis(methylpropylamido) dichromium, hexakis(dipropylamido) dichromium, hexakis(butylamido) dichromium, hexakis(methylamido) ditungsten, hexakis(dimethylamido) ditungsten, hexakis(ethylamido) ditungsten, hexakis(diethylamido) ditungsten, hexakis(methylethylamido) ditungsten, hexakis(propylamido) ditungsten, hexakis(methylpropylamido) ditungsten, hexakis(ethylpropylamido) ditungsten, hexakis(butylamido) ditungsten, hexakis(dibutylamido) ditungsten, hexakis(methylamido) dimolybdenum, hexakis(dimethylamido) dimolybdenum, hexakis(ethylamido) dimolybdenum, hexakis(diethylamido) dimolybdenum, hexakis(methylethylamido) dimolybdenum, hexakis(propylamido) dimolybdenum, hexakis(methylpropylamido) dimolybdenum, hexakis(ethylpropylamido) dimolybdenum, hexakis(butylamido) dimolybdenum, hexakis(dibutylamido) dimolybdenum, tetrakis(diamidoethane) dichromium, tetrakis(diamidoethane) ditungsten, and tetrakis(diamidoethane) dimolybdenum.

Examples of other metal amides of formula (1) are hexakis(dimethylamido) discandium, hexakis(dimethylamido) dititanium, hexakis(dimethylamido) divanadium, hexakis(dimethylamido) dimanganese, tetrakis(diethylamido)-bis-(μ-ethylamido) dizirconium, tetrakis(dimethylamido)-bis-(μ-ethylamido) dirhodium, tetrakis-(dimethylamido)-bis-(μ-ethylamido) ditantalum, hexakis(diethylamido)-tris-(μ-trimethylsilylamido) dilanthanum, and hexakis(diethylamido)-tris-(μ-trimethylsilylamido) diactinium.

The metal amide precursors may be prepared from lithium amides and the corresponding metal chlorides or by reaction of a silylamide with a metal chloride or fluoride as is known in the art.

The metal amide precursors are generally soluble in organic solvents such as methylene chloride, pentane, benzene, diphenylether, and acetonitrile or are malleable or meltable solids. Solutions or melts of the amides may, therefore, be applied to substate surfaces by spraying, dipping, or brushing. If the solution or melt is sufficiently viscous and non-volatile, it may be extruded in the form of rods, fibers or other shaped bodies.

The amides are pyrolyzed to metal carbides under nonoxidizing condition, e.g., in the presence of nonoxidizing gases such as nitrogen, ammonia, argon, or the like, at temperatures at which the carbon-containing moiety of the amide (i.e., the alkyl or ethylene group(s)) reacts with the metal to form one or more carbon-to-metal covalent bonds. The particular temperatures used in the pyrolysis will depend upon the precursor involved and will normally range between about 100° C. and about 1000° C., preferably about 200° C. and 900° C.

The relative amounts of metal, nitrogen, and carbon in the amide are believed to direct the formation of the carbide rather than nitride in the pyrolysis and to affect the atom ratio of carbon to metal in the resulting carbide. In this regard, it is believed that only amides that contain a multiplicity of metal atoms provide precursors for carbides. Through selection of the number of metal atoms and the amount of carbon in the amide, carbides of selected carbon-to-metal atom ratios may be prepared. For instance in the case of hexakis(dimethylamido) ditungsten or dimolybdenum, it was found that the atom ratio of carbon to tungsten/molybdenum in the resulting carbide is in excess and is about 1.4:1 to about 1.7:1, typically approximately 1.5:1. When the ratio is 1.5:1, the carbon-to-metal ratio is believed to be stoichiometric (i.e., $W_2C_3$ or $Mo_2C_3$). These novel carbides may be used in the same applications as are the known stoichiometric carbides, e.g., in making hard-/high temperature bodies or coatings, cermets or abrasives.

The following examples further illustrate the invention process and the novel metal carbides produced thereby. These examples are not intended to limit the scope of the invention in any manner.

EXAMPLE 1

Nickel-coated stainless steel tubes were charged with 0.07 g of hexakis(dimethylamido) ditungsten ($W_2(NMe_2)_6$) under an argon, nitrogen, or ammonia atmosphere and pyrolyzed at 800° C. for 25 minutes. A representative X-ray powder diffraction pattern of the pyrolysis product was made and is shown in FIG. 1. This pattern indicates that the product has the crystal structure of WC. Repeated elemental analyses, however, indicate the product to be hexagonal tungsten carbide, $WC_{1.5}$ ($W_2C_3$). (Found: W, 90.87; C, 8.79; N, 0.39.)

EXAMPLE 2

Figure 2:
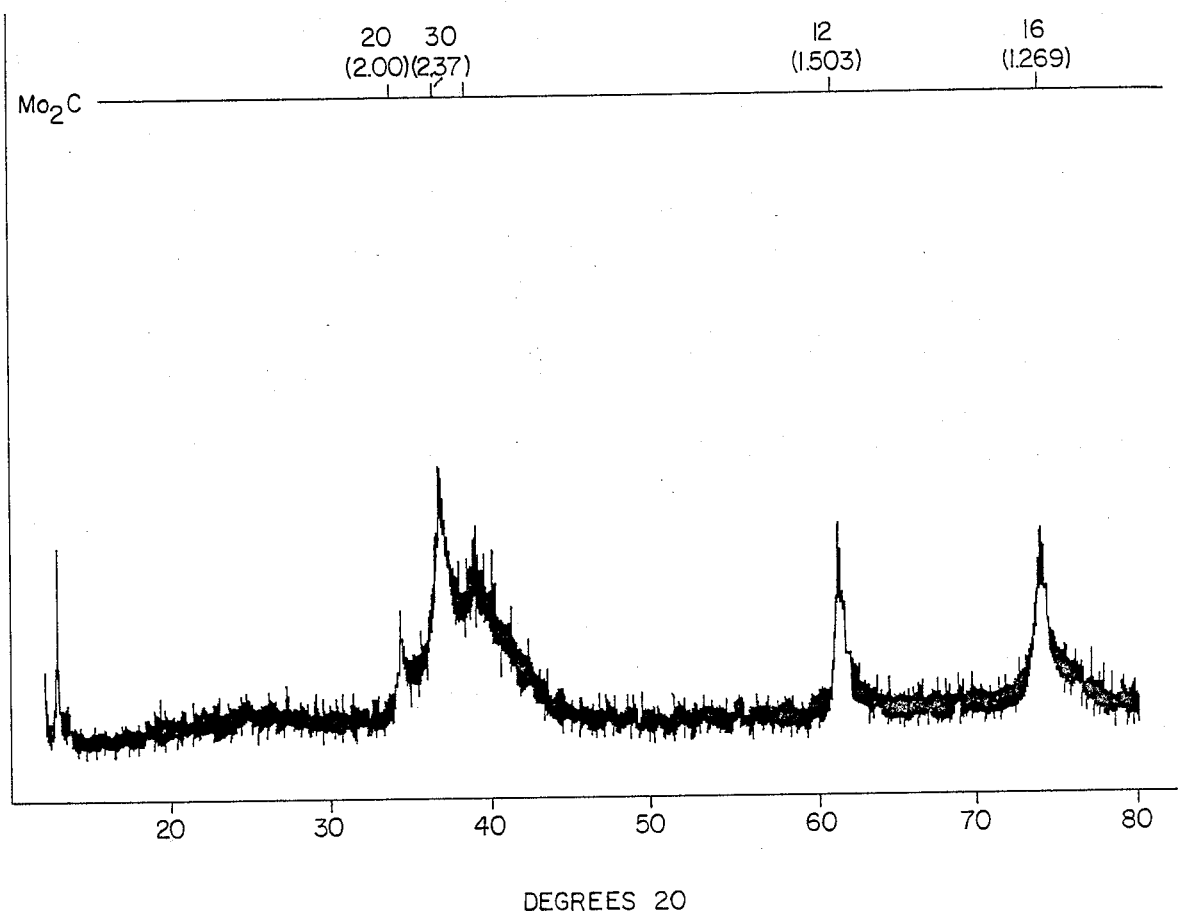
FIG. 2 is an X-ray powder diffraction pattern of the metal carbide product of Example 2, infra.

Example 1 was repeated except that 0.07 g of hexakis(dimethylamido) dimolybdenum was used in place of hexakis(dimethylamido) ditungsten. The X-ray powder diffraction pattern of the pyrolysis product of this example is shown in FIG. 2. Although this pattern indicates the product has the crystal structure of $Mo_2C$, repeated elemental analysis show the product to be molybdenum carbide, $MoC_{1.6}$ ($Mo_2C_3$). (Found: Mo, 83.14; C, 16.72; N, 0.34.)

Modifications of the above-described modes for carrying out the invention that are obvious to those of skill in the art are intended to be within the scope of the following claims.

I claim:

1. A process for making a transition metal carbide comprising pyrolyzing a tractable transition metal amide of the formula $$M_x(NR^1R^2)_y$$

where M is a transition metal selected from the group consisting of Sc, Ti, V, Cr, Mn, Fe, Co, Ni, Y, Zr, Nb, Mo, Tc, Ru, Rh, Pd, Hf, Ta, W, Re, Os, Ir, Pt, and all elements from atomic number 89 on, x is an integer and is equal to or greater than 2, $R^1$ and $R^2$ are the same or different and are hydrogen, lower alkyl, trimethylsilyl, or ethylene, with the proviso that both $R^1$ and $R^2$ are not hydrogen, and y is an integer equal to the valence of the $M_x$ unit, under nonoxidizing conditions at a temperature at which a carbon-containing group of the amido group of the amide undergoes chemical reaction with a metal atom of the amide to form at least one covalent carbon-to-metal bond.

2. The process of claim 1 wherein M is a transition metal selected from the group consisting of chromium, tungsten and molybdenum.

3. The process of claim 1 wherein M is tungsten or molybdenum.

4. The process of claim 2 wherein $R^1$ and $R^2$ are the same or different and are methyl or ethyl.

5. The process of claim 2 wherein $R^1$ and $R^2$ are methyl.

6. The process of claim 1 wherein the temperature is in the range of about 100° C. to about 1000° C.

7. The process of claim 3 wherein the temperature is in the range of about 200° C. and about 900° C.

8. The process of claim 4 wherein the temperature is in the range of about 200° C. and about 900° C.

9. The process of claim 5 wherein the temperature is in the range of about 200° C. and about 900° C.